April 5, 1932. F. JANSSEN 1,852,807
ELECTRIC MOTOR
Filed Aug. 12, 1929
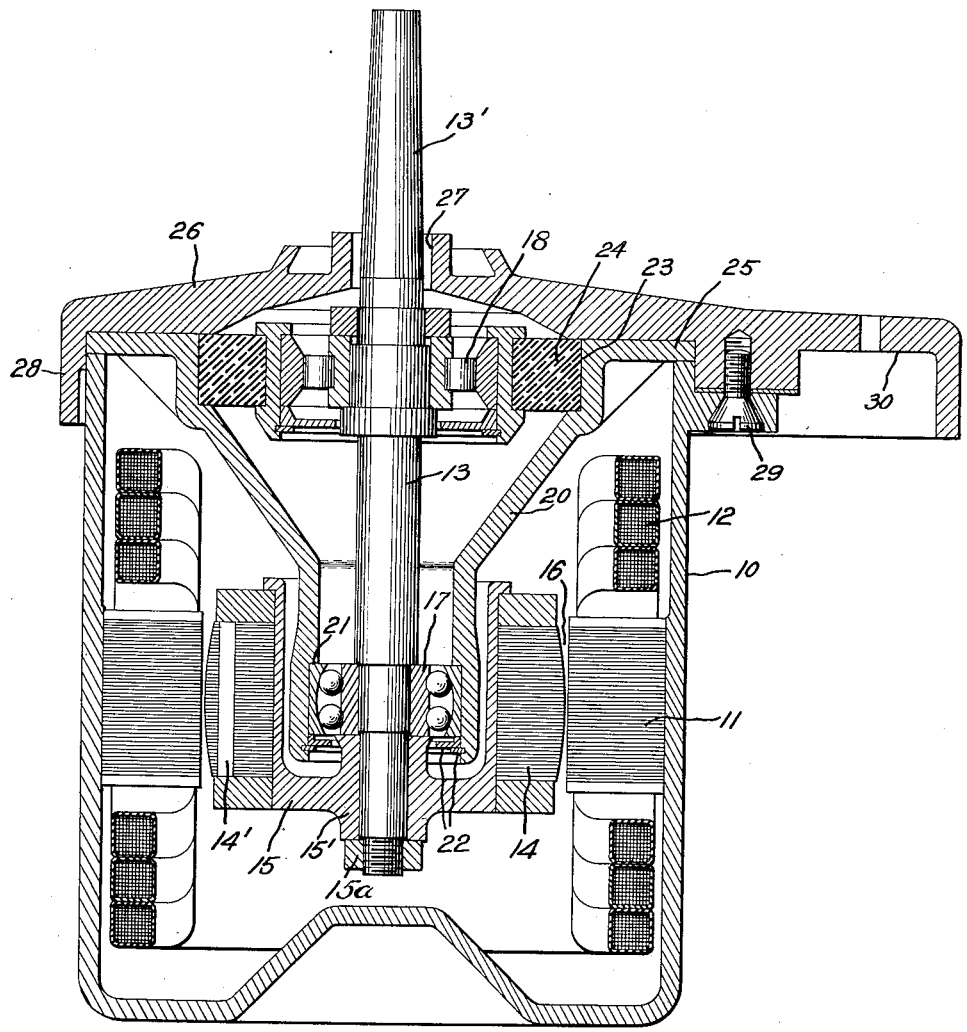
Inventor:
Fritz Janssen,
by Charles V. Tullar
His Attorney.

Patented Apr. 5, 1932

1,852,807

UNITED STATES PATENT OFFICE

FRITZ JANSSEN, OF BIRKENWERDER, GERMANY, ASSIGNOR TO GENERAL ELECTRIC COMPANY, A CORPORATION OF NEW YORK

ELECTRIC MOTOR

Application filed August 12, 1929, Serial No. 385,266, and in Germany November 30, 1928.

My invention relates to high speed electric motors of the type employed for driving spinning spindles, centrifugal spiders and rayon buckets, or the like.

In the operation of motors of this kind the rotatable member is ordinarily driven at very high speed, and usually above the critical speed of the shaft of the rotatable member. When passing through this critical speed the shaft vibrates to a considerable extent, and it is therefore necessary to make the air gap between the rotatable and stationary members of the motor large enough to permit this vibration of the shaft without bringing the rotatable member into contact with the stationary member. This has generally necessitated making the air gap so large as to impair the efficiency of the motors and give them a poor power factor.

The object of my invention is to provide a motor construction of this character in which the bearings are arranged in such a manner that the vibration of the motor shaft when passing through its critical speed will produce a minimum vibration of the rotatable member so that the air gap of the motor can be made small enough to obtain good efficiency and good power factor. I accomplish this by providing a universal bearing for the rotatable member substantially at the center thereof, and a second resiliently supported bearing therefor spaced axially of the rotatable member from the first-mentioned bearing both of which are supported from one end only of the stationary member.

My invention will be more fully set forth in the following description referring to the accompanying drawing and the features of novelty which characterize my invention will be set forth with particularity in the claims annexed to and forming a part of this specification.

The single figure of the drawing shows a longitudinal section of a vertical high speed rayon motor embodying my invention.

The vertical shaft rayon motor shown in the drawing is of the induction type and comprises a stationary member 10 having a slotted core structure 11 and the usual winding 12 arranged therein. The rotatable member of the motor comprises a vertical shaft 13 arranged coaxially of the core structure 11 having a core structure 14 secured thereto and arranged within the core structure 11, the core structure 14 being provided with a squirrel cage winding 14'. The core structures 11 and 14 are formed to provide an air gap which decreases from the ends toward its mid-portion as indicated at 16.

In accordance with my invention the rotatable member is supported in the stationary member by a universal bearing 17 arranged substantially at the center of the core structure 14 of the rotatable member and a bearing 18 spaced axially of the shaft from the universal bearing 17. The core structure 14 of the rotatable member is secured to the portion of the end of shaft 13 below the bearings 17 and 18, and beyond them, by a cup-shaped spider 15 having a hub 15' which is secured to the lower end of the shaft 13 by a nut 15a. By this arrangement it will be observed that the vibration of the shaft 13 in its bearings in passing through its critical speed will produce comparatively small movement in the core structure 14 with respect to the core structure 11 because the hub 15' is closely adjacent the center of the universal bearing 17. Moreover, the air gap is narrowed at the mid-portion radially from the center of the universal bearing which is made possible because there is little or no radial movement of the rotatable member with respect to the stationary member at this point. As a result, the average air gap of the motor can be made much smaller than in motors of prior construction.

The bearings 17 and 18 are supported in the stationary member by a tubular support 20 to which the stationary part of the universal bearing 18 is secured in the recess 21 by the retaining rings 22. The tubular member 20 is flared outwardly at its upper end to form a recess 23 for receiving a ring 24 of resilient material, such as rubber or the like, for supporting the stationary part of the bearing 18, and is also formed with a flange 25 which is adapted to be secured to the upper end of the stationary member 10 for supporting the bearings 17 and 18 from the upper end only thereof. The tubular member 20 is secured to the upper end of the stationary member 10 by a cover 26 having a central opening 27 of somewhat larger diameter than the tapered portion 13' of the shaft 13 to which a rayon bucket, or other suitable device, is secured. The cover 26 is also flanged at 28 to fit over the upper end of the stationary member 10, to which it is secured by screws 29, and is provided with recessed projections 30 for resiliently supporting the motor on rubber buffers carried by the spinning frame in which the motor is used.

By this construction it will be observed that when the shaft 13 of the motor passes through its critical speed that the resilient support 24 for the bearing 19 will permit the required deflection of the shaft, but as the core structure 14 of the rotatable shaft is secured to the shaft below the universal bearing 17 and outside of the bearings 17 and 18, the movement of the core structure 14 with respect to the core structure 11 of the stationary member will be much smaller than in prior constructions, so that I am enabled to make the air gap small to obtain good efficiency and power factor of the motor. Moreover, when it is desired to remove the rotatable member of the motor for inspection thereof, or the bearings 17 and 18, this can readily be done by simply removing the cover 26 and the tubular member 20 in which the motor bearings are both supported from the upper end of the stationary member 10.

Modifications of the particular form of my invention above set forth will occur to those skilled in the art, so that I do not desire my invention to be limited to the particular arrangement shown and described, and I intend in the appended claims to cover all modifications which do not depart from the spirit and scope of my invention.

What I claim as new and desire to secure by Letters Patent of the United States is:

1. A motor including stationary and rotatable members having an air gap decreasing from the ends axially thereof toward its mid-portion, a universal bearing for said rotatable member substantially at the center thereof and a second bearing therefor spaced axially from said universal bearing, means for resiliently supporting said second bearing, and means for supporting both of said bearings from one end of said stationary member.

2. A motor including stationary and rotatable members having an air gap decreasing from the ends toward its mid-portion, said rotatable member including a shaft having a universal bearing substantially at the center of said rotatable member and a second bearing spaced axially of said shaft from said universal bearing, a tubular member surrounding said shaft for supporting said bearings, and means for resiliently supporting said second bearing in said tubular member, said tubular member having a flange at one end only thereof secured to said stationary member.

In witness whereof, I have hereunto set my hand this 27th day of July, 1929.

FRITZ JANSSEN.